(12) United States Patent
Nomura

(10) Patent No.: US 10,306,099 B2
(45) Date of Patent: May 28, 2019

(54) INFORMATION PROCESSING APPARATUS AND SEMICONDUCTOR INTEGRATED CIRCUIT

(71) Applicant: CANON KABUSHIKI KAISHA, Tokyo (JP)

(72) Inventor: Yoshihisa Nomura, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 6 days.

(21) Appl. No.: 15/825,658

(22) Filed: Nov. 29, 2017

(65) Prior Publication Data

US 2018/0167531 A1 Jun. 14, 2018

(30) Foreign Application Priority Data

Dec. 12, 2016 (JP) .................. 2016-240441

(51) Int. Cl.
| | |
|---|---|
| G06K 15/00 | (2006.01) |
| H04N 1/32 | (2006.01) |
| G06F 13/24 | (2006.01) |
| G06F 11/07 | (2006.01) |
| H04N 1/00 | (2006.01) |
| G06F 9/48 | (2006.01) |
| G06F 3/12 | (2006.01) |

(52) U.S. Cl.
CPC ....... *H04N 1/32641* (2013.01); *G06F 9/4812* (2013.01); *G06F 11/07* (2013.01); *G06F 11/0772* (2013.01); *G06F 13/24* (2013.01); *H04N 1/00* (2013.01); *H04N 1/32* (2013.01); *G06F 2213/2424* (2013.01); *Y02D 10/14* (2018.01); *Y02D 10/24* (2018.01)

(58) Field of Classification Search
None
See application file for complete search history.

(56) References Cited

U.S. PATENT DOCUMENTS

| | | | |
|---|---|---|---|
| 6,897,872 B2 | 5/2005 | Date | |
| 8,266,358 B2* | 9/2012 | Katoh | G06F 1/325 |
| | | | 710/260 |
| 2004/0024926 A1 | 2/2004 | Date | |
| 2004/0051895 A1* | 3/2004 | Aizawa | G06K 15/00 |
| | | | 358/1.13 |

FOREIGN PATENT DOCUMENTS

JP 2004064631 A 2/2004

* cited by examiner

*Primary Examiner* — Dov Popovici
(74) *Attorney, Agent, or Firm* — Venable LLP

(57) ABSTRACT

In a system constructed by a plurality of integrated circuits, interrupt control can be performed in the case where an interrupt has occurred in an integrated circuit in which the function of a CPU is suspended. An interrupt unit of a second integrated circuit outputs an interrupt to at least one of the plurality of image processing units of the second integrated circuit, an image processing unit of the second integrated circuit, to which the interrupt is input, outputs an interrupt to a first integrated circuit, an image processing unit of the first integrated circuit, to which an interrupt from the second integrated circuit is input, outputs an interrupt to an interrupt unit of the first integrated circuit, and the interrupt unit of the first integrated circuit outputs an interrupt to an control unit of the first integrated circuit in accordance with the interrupt being input.

20 Claims, 9 Drawing Sheets

INFORMATION PROCESSING APPARATUS AND SEMICONDUCTOR INTEGRATED CIRCUIT

BACKGROUND OF THE INVENTION

Field of the Invention

The present invention relates to a technique to perform interrupt control via a communication bus that connects integrated circuits in an information processing apparatus constructed by a plurality of integrated circuits.

Description of the Related Art

A digital multi function printer is known, which includes a variety of functions, such as a scanner function, a printer function, a copy function, a network function, and a FAX transmission/reception function. Each function in such a digital multi function printer is controlled by a controller having a control unit configured to control input/output operations of image data, which are performed with an external device, and a plurality of image processing units configured to perform predetermined image processing for image data (see Japanese Patent Laid-Open No. 2004-064631).

By recent development of semiconductor, it is made possible to install many functions on one LSI (Large-Scale Integrated circuit). Consequently, a system has appeared in which the configuration of the above-described controller is constructed on one LSI. Further, a system has also appeared in which the function is used selectively for each LSI by using a plurality of such LSIs. For example, there is a system in which two LSIs are connected by a communication bus and the system control processing and the printer function are installed in one of the LSIs (hereinafter, called a main chip) and the other functions (scanner function and the like) are installed in the other LSI (hereinafter, called an extension chip). In the system in which the function is used selectively for each LSI by using a plurality of LSIs as described above, there is a case where power consumption is reduced by shutting off the power source of a circuit relating an unused function or by suspending clock supply to the circuit. For example, there is a system in which the function of a CPU of the extension chip is suspended by causing a CPU of the main chip to control the extension chip.

However, in the case where the function of the CPU of the extension chip is suspended, even though an interrupt controller receives a request for interrupt processing in the extension chip, it is no longer possible to give an interrupt notification to the CPU. Consequently, in the case where the function of the CPU of the extension chip is suspended, a mechanism is necessary, in which the interrupt controller of the extension chip notifies the CPU of the main chip of an interrupt.

Consequently, an object of the present invention is to provide an information processing apparatus capable of appropriately performing interrupt control even in the case where an interrupt has occurred in an integrated circuit in which the function of a CPU is suspended in a system constructed by a plurality of integrated circuits.

SUMMARY OF THE INVENTION

The information processing apparatus according to the present invention is an information processing apparatus including: a first semiconductor integrated circuit having a plurality of image processing units, a control unit configured to control the plurality of image processing units, and an interrupt unit configured to output an interrupt to the control unit; and a second semiconductor integrated circuit connected with the first semiconductor integrated circuit so as to be capable of communication and having a plurality of image processing units, a control unit configured to control the plurality of image processing units, and an interrupt unit configured to output an interrupt to the control unit, and in which the interrupt unit of the second semiconductor integrated circuit outputs an interrupt to at least one of the plurality of image processing units of the second semiconductor integrated circuit, the image processing unit of the second semiconductor integrated circuit, to which the interrupt is input, outputs an interrupt to the first semiconductor integrated circuit in accordance with the interrupt being input, the image processing unit of the first semiconductor integrated circuit, to which an interrupt from the second semiconductor integrated circuit is input, outputs an interrupt to the interrupt unit of the first semiconductor integrated circuit in accordance with the interrupt being input, and the interrupt unit of the first semiconductor integrated circuit outputs an interrupt to the control unit of the first semiconductor integrated circuit in accordance with the interrupt being input.

Further features of the present invention will become apparent from the following description of exemplary embodiments with reference to the attached drawings.

DESCRIPTION OF THE EMBODIMENTS

First Embodiment

In the following, embodiments for embodying the present invention are explained by using the drawings. The configurations shown in the following embodiments are merely exemplary and the present invention is not limited to the configurations shown schematically.

<Image Forming Apparatus>

Figure 1:
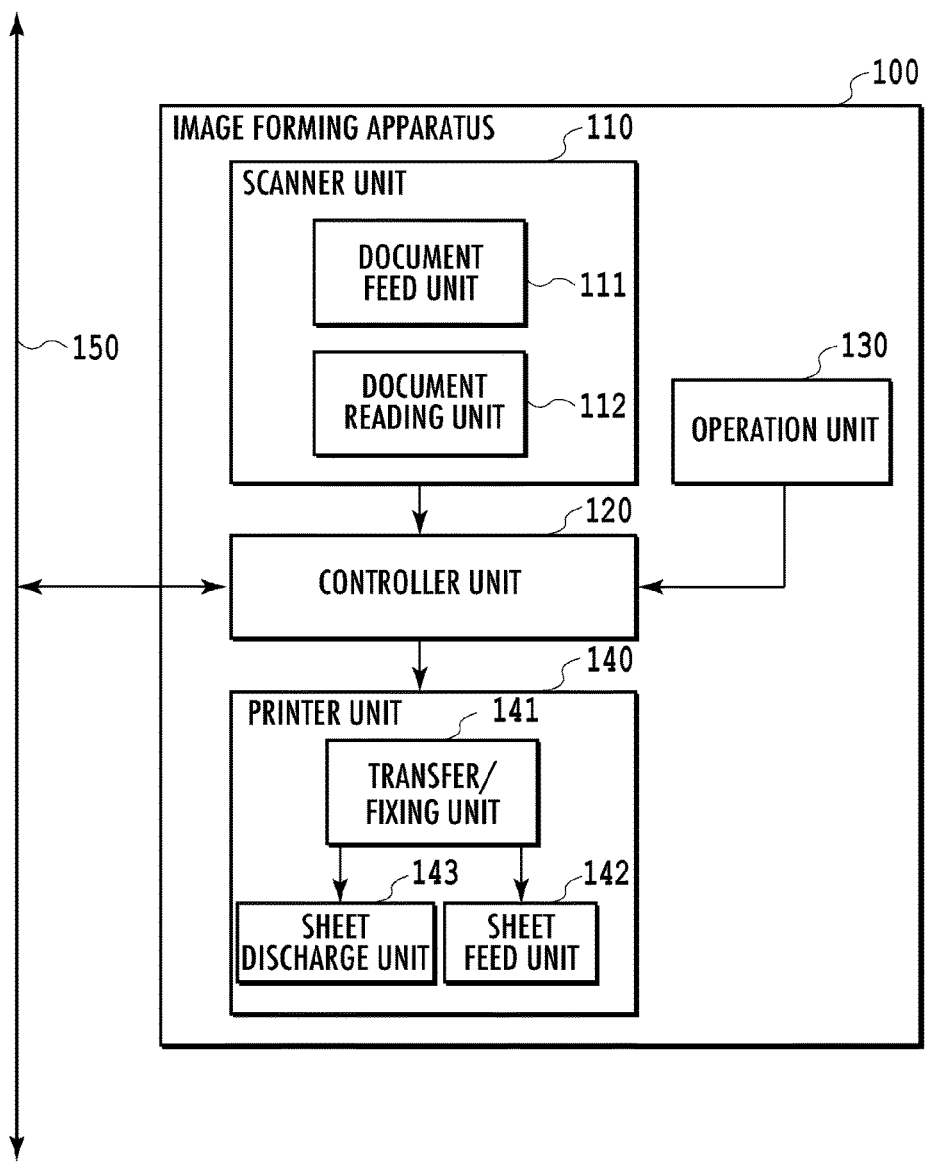
FIG. 1 is a block diagram showing a configuration of an image forming apparatus in a first embodiment.

FIG. 1 is a block diagram showing a configuration of an image forming apparatus 100 in a first embodiment. As shown in FIG. 1, the image forming apparatus 100 includes a scanner unit 110, a controller unit (also called an information processing apparatus) 120, an operation unit 130, and a printer unit 140.

The scanner unit 110 optically reads a document image and converts the image into image data. The scanner unit 110 includes a document reading unit 112 configured to read a document and a document feed unit 111 configured to convey a document. The printer unit 140 conveys a printing medium (sheet) and prints image data as a visible image on the printing medium. The printer unit 140 includes a sheet feed unit 142 configured to feed a sheet, a transfer/fixing unit 141 configured to transfer image data onto a sheet and to fix the image data, and a sheet discharge unit 143 configured to sort and staple a printed sheet and to discharge the sheet out of the apparatus. The controller unit 120 is electrically connected with the scanner unit 110 and the printer unit 140. The controller unit 120 is further connected with the network 150, such as LAN, ISDN, Internet, and intranet. The controller unit 120 provides a copy function to acquire image data of a document by controlling the scanner unit 110 and to print and output the image data on a sheet by controlling the printer unit 140. Further, the controller unit 120 provides a scanner function to convert image data acquired by controlling the scanner unit 110 into code data and to transmit the code data to a host computer, not shown schematically, via the network 150. Further, the controller unit 120 provides a printer function to covert code data received from the host computer via the network 150 into image data and to print the image data on a sheet by controlling the printer unit 140. Further, the controller unit 120 has a FAX reception function to print data received from the network 150 (for example, ISDN) and a FAX transmission function to transmit scan data to the network 150. Instructions to perform the processing in each function, such as the scanner, printer, and FAX transmission/reception functions, is called a job and the image forming apparatus 100 performs the processing in accordance with each job. The operation unit 130 is, for example, a liquid crystal touch panel, and connected to the controller unit 120. The operation unit 130 provides a user interface to operate the image forming apparatus 100.

<Controller Unit>

Figure 2:
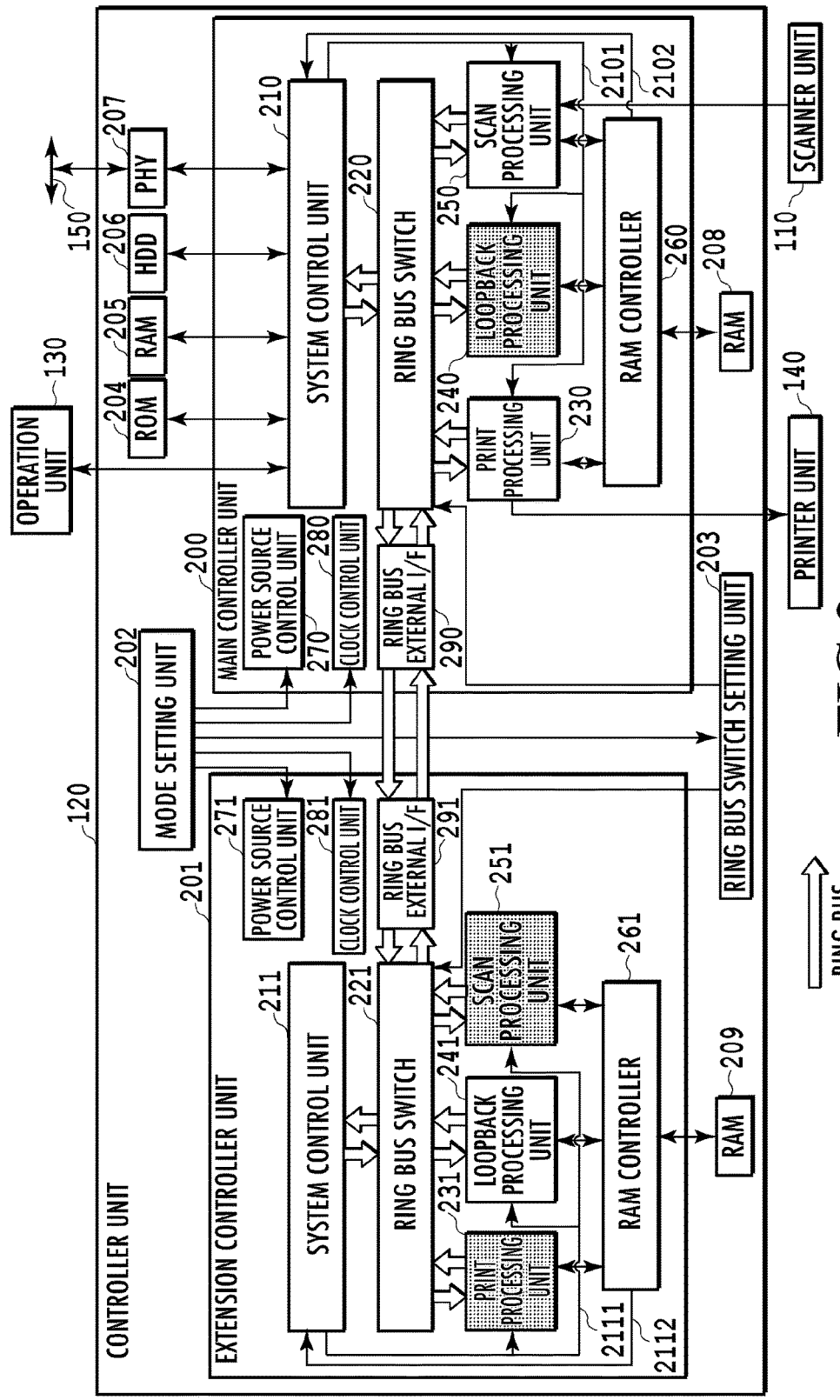
FIG. 2 is a block diagram showing a configuration of a controller unit in the first embodiment.

FIG. 2 is a block diagram showing a configuration of the controller unit 120 in the first embodiment. The controller unit 120 has a main controller unit 200, an extension controller unit 201, a mode setting unit 202, and a ring bus switch setting unit (also called a path setting unit) 203. Further, the controller unit 120 has a ROM 204, a RAM 205, an HDD 206, and a PHY 207. Furthermore, the controller unit 120 has RAMs 208 and 209 used as a temporary work area by each processing module (print processing unit, loopback processing unit, and scan processing unit, to be described later). The main controller unit 200 and the extension controller unit 201 are connected by a ring bus (communication bus indicated by a solid white arrow in FIG. 2).

Each component of the controller unit 120 is explained. In the present embodiment, the controller unit 120 is an electronic circuit board, such as a printed board, and the main controller unit 200 and the extension controller unit 201 are each an LSI. The controller unit 120, the main controller unit 200, and the extension controller unit 201 may be implemented in other aspects. In the present embodiment, the configuration of the extension controller unit 201 is the same as the configuration of the main controller unit 200. However, as long as being capable of operating as an integrated circuit for extension, the extension controller unit 201 may have any function and any configuration. That is, it is only required for the extension controller unit 201 to have an interface capable of transmitting and receiving packet data by connecting to the ring bus.

First, the main controller unit 200 is explained. The main controller unit 200 has a system control unit (also called a control module) 210, a ring bus switch 220, a print processing unit 230, a loopback processing unit 240, and a scan processing unit 250. The main controller unit 200 further has a power source control unit 270, a clock control unit 280, a RAM controller 260, and a ring bus external interface (ring bus external I/F) 290.

The system control unit 210 of the main controller unit 200 controls the scan processing using the scanner unit 110 and the print processing using the printer unit 140. The system control unit 210 transfers image data used for the processing via the ring bus switch 220. The system control unit 210 and the ring bus switch 220 are connected by the ring bus. Further, the system control unit 210 performs transmission of data to the network 150, reception of data from the network 150, display processing of the operation unit 130, and so on. As above, the system control unit 210 centralizedly controls the entire system.

The ring bus switch 220 of the main controller unit 200 performs switch control of the ring bus to transfer image data to each block within the controller unit 120. That is, the ring bus switch 220 performs path control of the ring bus. In the present embodiment, the ring bus to transfer image data to each block is connected in the form of a ring via the ring bus switch 220 as shown in FIG. 2. Due to this, it is possible for the system control unit 210 to transmit and receive image data to and from the print processing unit 230, the loopback processing unit 240, the scan processing unit 250, and the ring bus external I/F 290. The ring bus switch 220 includes a switch to change the connection destinations of each block located on the ring bus in accordance with the necessity. The ring bus switch 220 controls the switch in accordance with the setting value of the ring bus switch setting unit 203 (specifically, a register possessed by the ring bus switch setting unit 203). The switch control that is performed by the ring bus switch 220 will be described later.

The print processing unit 230 of the main controller unit 200 performs various kinds of image processing, such as color space conversion processing, halftone processing, and gamma correction, to print image data by the printer unit 140. The print processing unit 230 receives image data from the ring bus switch 220 and outputs the image data to the printer unit 140 after performing the above-described image processing for the image data.

The loopback processing unit 240 of the main controller unit 200 is a block that performs image processing having a possibility of being made use of both in the print processing and in the scan processing. In the present embodiment, the loopback processing unit 240 performs scaling processing, image combination processing, rotation processing, and so on. The loopback processing unit 240 receives image data from the system control unit 210 via the ring bus, performs the above-described image processing for the image data, and transfers the image data after the processing to the ring bus switch 220. The image data transferred to the ring bus switch 220 is transferred to the system control unit 210 via the ring bus.

The scan processing unit 250 of the main controller unit 200 performs image processing, such as shading correction processing, MTF correction processing, input gamma correction, and filter processing, for the image data acquired by the scanner unit 110. The scan processing unit 250 performs the image processing for the image data transferred from the scanner unit 110 and transfers the image data after the processing to the ring bus switch 220. The image data transferred to the ring bus switch 220 is transferred to the system control unit 210 via the ring bus.

The RAM controller 260 of the main controller unit 200 temporarily writes the image data received from the print processing unit 230, the loopback processing unit 240, and the scan processing unit 250 to the RAM 208. Further, the RAM controller 260 reads the image data written to the RAM 208 in accordance with instructions from each processing module (the print processing unit 230, the loopback processing unit 240, and the scan processing unit 250) and transfers the image data to each processing module. As above, each of the print processing unit 230, the loopback processing unit 240, and the scan processing unit 250 makes use of the RAM 208 as a temporary image buffer at the time of performing the image processing. Further, at this time, through the transfer path between the RAM controller 260 and the RAM 208, image data of each of the print processing unit 230, the loopback processing unit 240, and the scan processing unit 250 flows back and forth in a multiplexed manner. Because of this, in the case where data transfer exceeding the transfer processing performance (memory band performance) of this transfer path is requested, a transfer wait state occurs. Consequently, the case occurs frequently where the data transfer between the RAM controller 260 and the RAM 208 causes a bottleneck of the processing capability of the main controller unit 200. Further, the RAM controller 260 issues an interrupt signal 2102 in the case where the status has changed. For example, the RAM controller 260 performs initialization, such as adjustment timing of access to the RAM 208 at the time of activation, and issues an interrupt signal at the time of completion of initialization. As shown in FIG. 2, the interrupt signal 2102 is notified to a CPU (a CPU 310, to be described later) of the system control unit 210.

The ring bus external I/F 290 of the main controller unit 200 is an interface that connects the ring bus with the ring bus switch 220 as a center, which is located within the main controller unit 200, and the outside of the main controller unit 200. The main controller unit 200 performs transmission and reception of data with the outside via the ring bus external I/F 290. In the present embodiment, as shown in FIG. 2, the ring bus external I/F 290 is connected with the extension controller unit 201 by the ring bus.

The power source control unit 270 of the main controller unit 200 controls a voltage that is supplied to each processing module. The clock control unit 280 of the main controller unit 200 controls a clock that is input to each processing module.

An interrupt signal 2101 is output from the system control unit 210 (specifically, an interrupt control unit 380 of the system control unit 210, to be described later). Each of the print processing unit 230, the loopback processing unit 240, and the scan processing unit 250 includes an interrupt external port to input an interrupt signal and an interrupt control unit, as will be described later. As shown in FIG. 2, the interrupt control unit 380 of the system control unit 210 and the external port of each processing module are connected by a signal line capable of transferring the interrupt signal 2101. The interrupt signal 2101 is input to the interrupt control unit of each processing module via the interrupt external port of each processing module.

Next, the extension controller unit 201 is explained. The extension controller unit 201 is an integrated circuit for extension to increase the speed of the processing of the controller unit 120. In the present embodiment, the configuration of the extension controller unit 201 is the same as that of the main controller unit 200. Consequently, the function of each block (a system control unit 211, a ring bus switch 221, a power source control unit 271, a clock control unit 281, and a ring bus external I/F 291) within the extension controller unit 201 is the same as that of the corresponding block within the main controller unit 200. Further, an interrupt signal 2111 that is output from the system control unit 211 is the same as the interrupt signal 2101 within the main controller unit 200. In the present embodiment, of a print processing unit 231, a loopback processing unit 241, and a scan processing unit 251 of the extension controller unit 201, the loopback processing unit 241 is used as an extension function. The reason is as follows. In the case where the print processing unit 231 or the scan processing unit 251 is used, the necessity arises to change the connection of the printer unit 140 or the scanner unit 110 from the main controller unit 200 to the extension controller unit 201, and therefore, the configuration of the controller unit 120 becomes complicated. Further, in the present embodiment, it is possible to shut off the power source that is supplied to the print processing unit 231 and the scan processing unit 251 that do not need to be caused to operate, or to a CPU (a CPU 311 shown in FIG. 7) within the system control unit 211 and to suspend the clock that is supplied thereto. Due to this, it is made possible to suppress the power consumption of the system. In FIG. 2, the blocks to which the power source is shut off or to which the clock is suspended are displayed in gray-out.

The mode setting unit 202 outputs signals to perform setting of the power source control units 270 and 271 and the clock control units 280 and 281. Further, the mode setting unit 202 outputs a signal to perform setting of the ring bus switch setting unit 203. In the mode setting unit 202, information to control those signals (hereinafter, referred to as mode setting information) is set in advance. Then, in the case where the power source of the controller unit 120 is turned on, before the main controller unit 200, the extension controller unit 201, and the ring bus switch setting unit 203 activate, the signals are output from the mode setting unit 202 in accordance with the mode setting information. The power source control units 270 and 271 supply a voltage only to the processing units specified by the signals from the mode setting unit 202. Further, the clock control units 280 and 281 also output a desired clock similarly only to the processing units specified by the signals from the mode setting unit 202. Furthermore, the ring bus switch setting unit 203 also outputs a control signal similarly to the ring bus switch 220 in accordance with the signal from the mode setting unit 202. Due to this, it is made possible to cause one of the LSIs to operate as the main controller unit and the other LSI to operate as the extension controller unit. Further, it is made possible to cause part of the processing units in the main controller unit and the extension controller unit to operate or suspend. To the power source control units 270 and 271 and the clock control units 280 and 281, the signals output from the mode setting unit 202 are input via input terminals (not shown schematically) of the main controller unit 200 and the extension controller unit 201.

<System Control Unit>

Figure 3:
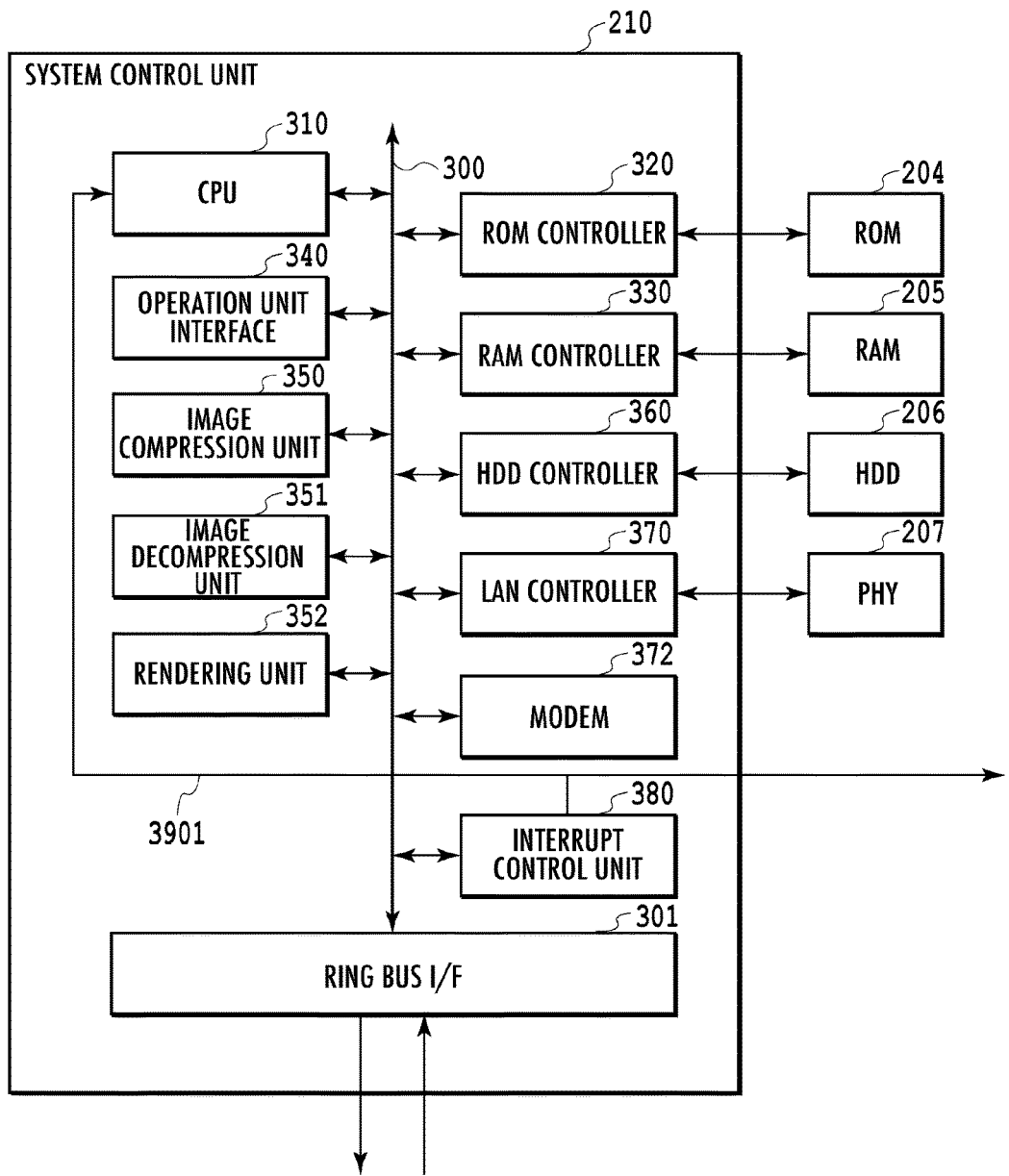
FIG. 3 is a block diagram showing an internal configuration of a system control unit of a main controller unit.

In the present embodiment, the configuration of the system control unit 210 of the main controller unit 200 is the same as the configuration of the system control unit 211 of the extension controller unit 201. Consequently, in the following, the internal configuration of the system control unit 210 is explained. FIG. 3 is a block diagram showing the internal configuration of the system control unit 210 of the main controller unit 200. By using FIG. 3, each block within the system control unit 210 is explained in detail.

Each block within the system control unit 210 is connected by a system bus 300. The CPU 310 is a processor that controls the entire system. The CPU 310 centralizedly controls job processing, such as print processing and scan processing, in accordance with the OS and control programs loaded onto the RAM 205.

A ROM controller 320 is a control module to access the ROM 204. In the ROM 204, a boot program of the system is stored. In the case where the power source of the image forming apparatus 100 is turned on, the CPU 310 accesses the ROM 204 via the ROM controller 320 and the CPU 310 boots.

A RAM controller 330 is a control module to access the RAM 205. In the RAM 205, control programs of the system and image data are stored. The RAM controller 330 includes a register to perform setting and control of the RAM 205. This register can be accessed by the CPU 310.

An operation unit interface 340 receives operation instructions of a user, which are input from the operation unit 130, performs control of a display of operation results, and so on.

An HDD controller 360 connects the HDD (Hard Disk Drive) 206 and the system bus 300. The HDD 206 stores system software and application programs. Further, the HDD 206 stores image data and page information and job information corresponding to each piece of image data. The CPU 310 reads data from the HDD 206, writes data to the HDD 206, and so on, by inputting instructions to the HDD controller 360.

A LAN controller 370 connects to the network 150 via the PHY 207 and inputs and outputs information, such as image data, to and from the external host computer.

A modem 372 connects to a public line, not shown schematically, and performs data communication with an external FAX machine at the time of job processing, such as FAX transmission processing and FAX reception processing, being performed.

An image compression unit 350 performs processing to compress image data that is stored in the RAM 205 or the HDD 206 into a JPEG format. Further, an image decompression unit 351 performs processing to decompress image data compressed into the JPEG format.

A rendering unit 352 converts image data (PDL data) received from the network 150 via the LAN controller 370 into bitmap data that can be handled by the printer unit 140.

The interrupt control unit 380 controls an interrupt in the system control unit 210. The interrupt control unit 380 receives an interrupt processing request that is input to the system control unit 210 and gives a notification of interrupt (hereinafter, called an interrupt notification) to the CPU 310. In the present embodiment, upon receipt of an interrupt processing request, the interrupt control unit 380 sends out an interrupt signal 3901 to the CPU 310. Due to this, the interrupt notification is given to the CPU 310. It is possible for the interrupt control unit 380 to input an interrupt processing request from each processing module and further to select whether or not to notify the CPU 310 of the input interrupt processing request as the interrupt signal 3901. The interrupt signal 3901 is output to the outside as the interrupt signal 2101 shown in FIG. 2 from a port (not shown schematically) of the system control unit 210.

A ring bus I/F 301 is an interface that connects the system bus 300 within the system control unit 210 and the ring bus with the ring bus switch 220 as a center, which is located outside the system control unit 210. In the following, data that flows through the ring bus is called packet data or simply a packet. The ring bus I/F 301 transmits packet data stored in the RAM 205 or the HDD 206 to the ring bus. Further, the ring bus I/F 301 stores packet data received from the ring bus in the RAM 205 or the HDD 206. Here, packet data is explained in detail.

Figure 4:
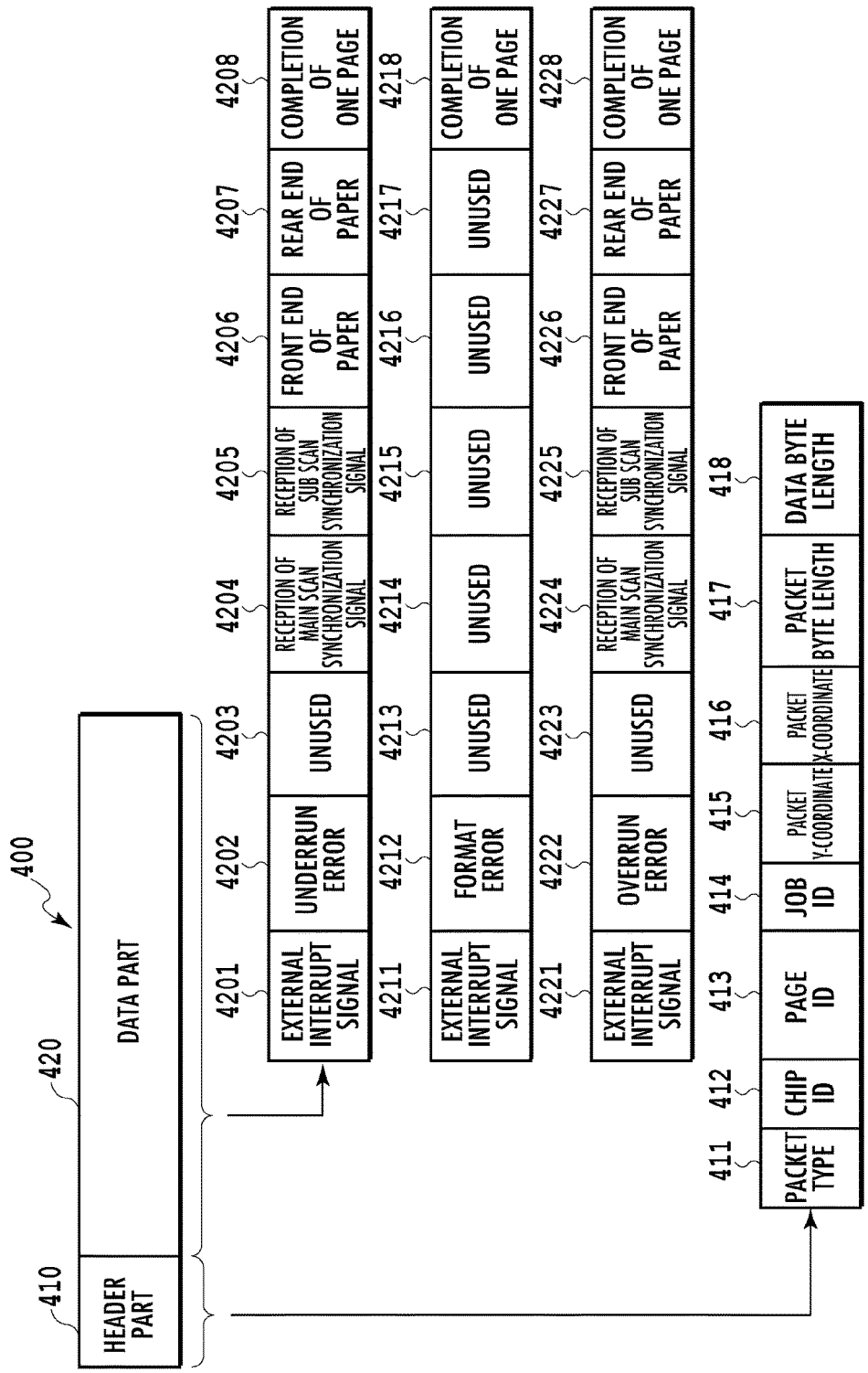
FIG. 4 is a diagram showing an example of packet data that flows through a ring bus in the first embodiment.

FIG. 4 is a diagram showing an example of packet data that flows through the ring bus in the first embodiment. A packet 400 has a header part 410 and a data part 420. The header part 410 includes a packet type 411, a chip ID 412, a page ID 413, a job ID 414, a packet Y-coordinate 415, a packet X-coordinate 416, a packet byte length 417, and a data byte length 418.

The packet type 411 is information indicating which of image data, a command, and an interrupt the packet 400 is. In the case where the packet type 411 indicates image data, in the data part 420, image data is stored. In the case where the packet type 411 indicates a command, in the data part 420, data indicating a setting address and a setting value to set a coefficient and a mode of each processing unit is stored. In the case where the packet type 411 indicates an interrupt, in the data part 420, status data indicating an interrupt factor is stored.

The chip ID 412 is an ID (identifier) to identify the processing unit that is the target (destination) to which the packet 400 is transmitted. For example, in the case where the chip ID is 0, the print processing unit 230 is the target. In the case where the chip ID is 1, the loopback processing unit 240 is the target. In the case where the chip ID is 2, the scan processing unit 250 is the target. In the case where the chip ID is 3, the system control unit 210 (specifically, the interrupt control unit 380 of the system control unit 210) is the target. In the case where the chip ID is 4, the loopback processing unit 241 within the extension controller unit 201 is the target.

The page ID 413 indicates the page number to which the packet 400 belongs. There is a case where the processing, such as scan and print processing, is performed for a plurality of pages and the page ID 413 is information indicating to which page the packet 400 belongs in such a case.

The job ID 414 indicates the job number to which the packet 400 belongs. For example, in the case where a scan job and a print job are performed at the same time, to the packet of the scan job, 1 is allocated and to the packet of the print job, 2 is allocated. Due to this, it is made possible to identify the job.

The packet Y-coordinate 415 indicates the position (Y-coordinate) within a page of image data in the case where the image data is stored in the data part 420. The packet X-coordinate 416 indicates the position (X-coordinate) within a page of image data in the case where the image data is stored in the data part 420. The image data that is stored in the data part 420 is obtained by dividing image data in units of pages into rectangular sizes of a predetermined number of pixels (for example, 32 pixels×32 pixels). Consequently, in the case where page data is regenerated from packet data, the above-described Y-coordinate and X-coordinate are referred to. The image data that is stored in the data part 420 is data (compressed image data) compressed by the image compression unit 350 or a compressor installed in each processing unit. The packet byte length 417 indicates the total number of bytes of the packet 400 and the data byte length 418 indicates the total number of bytes of the data part 420.

Through the ring bus in the present embodiment, the packet data as explained above flows and each processing unit receives and interprets the packet data. Then, in the case where the packet received by each processing module is a packet including a command, a mode, a coefficient, and so on, of the processing, which are specified by the command, are set to each processing module. After this, each processing module operates in accordance with the mode and the coefficient set to the module itself. In the case where the packet received by each processing module is a packet including image data, in each processing module, image processing for the image data is performed.

Figure 5:
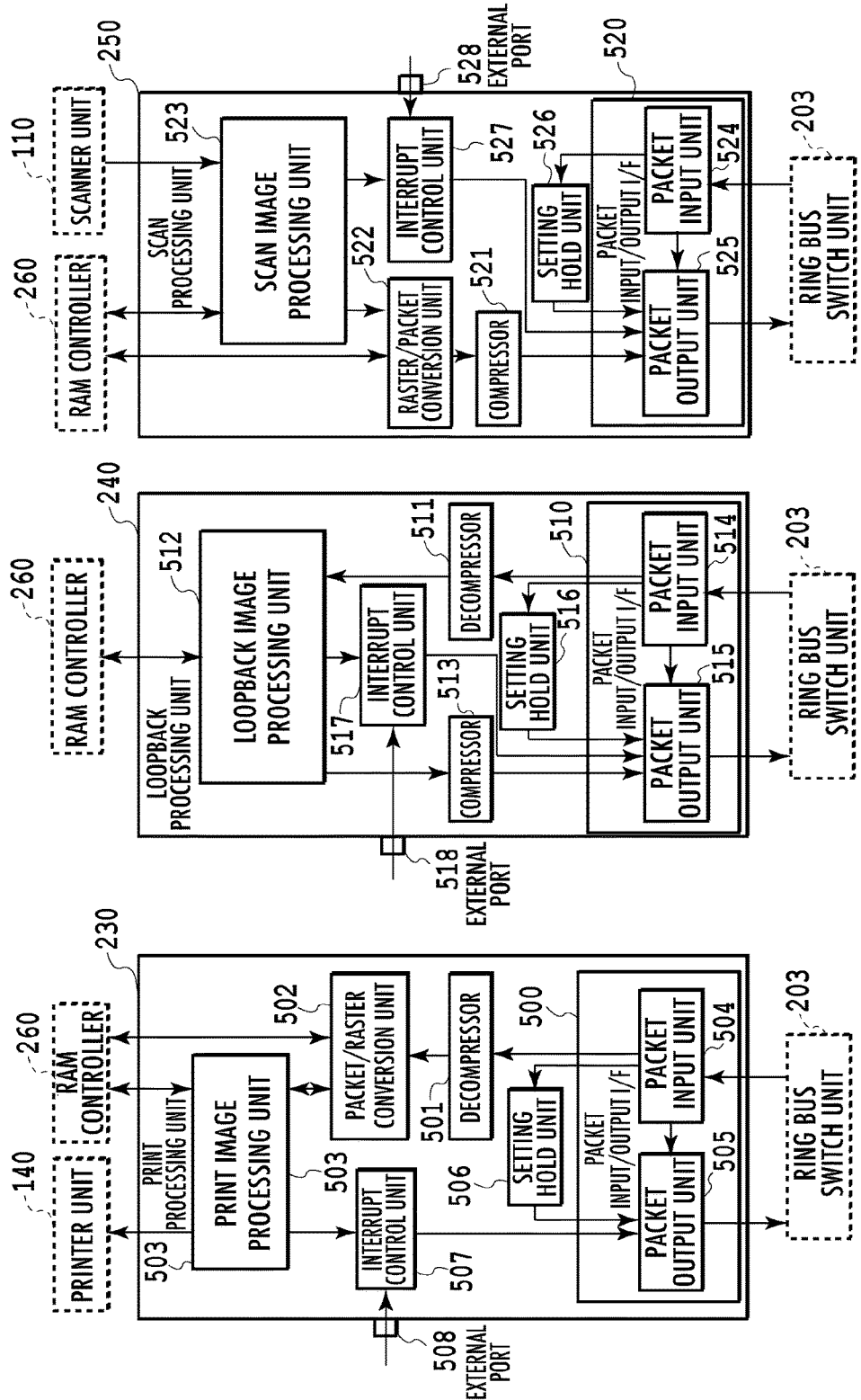
FIG. 5A to FIG. 5C are each a block diagram showing an example of an internal configuration of a print processing unit, a loopback processing unit, and a scan processing unit, respectively, in the first embodiment.

Next, the print processing unit 230, the loopback processing unit 240, and the scan processing unit 250 are explained in detail by using FIG. 5A to FIG. 5C. FIG. 5A to FIG. 5C are block diagrams showing examples of inner configurations of the print processing unit 230, the loopback processing 240, and the scan processing unit 250, respectively, in the first embodiment. In the present embodiment, the processing modules (the print processing unit 230, the loopback processing unit 240, and the scan processing unit 250) that perform image processing for image data are taken as examples. However, it is needless to say that the main controller unit 200 and the extension controller unit 201 may have a processing module that receives a packet including data other than image data and performs processing other than image processing for the received data.

<Print Processing Unit>

FIG. 5A shows an example of an internal configuration of the print processing unit 230. A packet input/output I/F 500 has a packet input unit 504 and a packet output unit 505. Upon receipt of a packet, the packet input unit 504 refers to the chip ID 412 of the header part 410 and checks whether the ID is the same as the chip ID allocated to the packet input unit 504 itself. In the case where the ID indicated by the chip ID 412 is different from the chip ID allocated to the packet input unit 504 itself, the packet input unit 504 determines that the packet is not a packet that should be processed by the print processing unit 230. Then, the packet input unit 504 transfers the packet to the packet output unit 505. On the other hand, in the case where the ID indicated by the chip ID 412 is the same as the chip ID allocated to the print processing unit 230, the packet input unit 504 determines that the packet is a packet that should be processed by the print processing unit 230. At this time, in the case where image data is included in the packet, image processing is performed for the image data via a decompressor 501, a packet/raster conversion unit 502, and a print image processing unit 503. In the case where a command is included in the packet, the packet input unit 504 refers to the setting address and the setting value stored in the data part 420 and sets the specified coefficient and mode to a setting hold unit 506. In the case where the packet includes a command to read the setting value, a packet storing the setting value is sent to the packet output unit 505 by the setting hold unit 506. The setting hold unit 506 holds the setting value that is used by the print processing unit 230. The decompressor 501, the packet/raster conversion unit 502, and the print image processing unit 503 perform processing based on the setting values held by the setting hold unit 506.

In the case of detecting an interrupt signal from an interrupt external port (hereinafter, simply called an external port) 508 or the print image processing unit 503, an interrupt control unit 507 holds an interrupt factor corresponding to the detected interrupt signal as an interrupt status value. Then, the interrupt control unit 507 generates an interrupt packet (a packet whose packet type indicates an interrupt).

Here, generation of an interrupt packet is explained. First, generation of the header part 410 is explained. The interrupt control unit 507 sets a value indicating an interrupt packet to the packet type 401. Further, the interrupt control unit 507 sets the chip ID (in the present embodiment, 3) of the system control unit 210 to the chip ID 412. Furthermore, the interrupt control unit 507 sets the total number of bytes of the packet to the packet byte length 417 and sets the total number of bytes of the interrupt status value to the data byte length 418. Other pieces of information of the header part 410 are not used, and therefore, arbitrary values are set thereto.

Next, generation of the data part 420 is explained. The interrupt control unit 507 stores the interrupt status value held at the time of detection of the interrupt signal in the data part 420. Interrupt factors 4201 to 4208 shown in FIG. 4 are examples of information that is stored in the data part of the interrupt packet sent out from the print processing unit 230. The interrupt control unit 507 sets values to the interrupt factors 4201 to 4208 in accordance with the detected interrupt signal. In the present embodiment, to the interrupt factors 4201 to 4208, "0" is set as the initial value and in the case where an interrupt signal is detected, "1" is set to the interrupt factor corresponding to the detected interrupt signal. The interrupt factor 4201 is set in the case where an interrupt signal from the external port 508 is detected. The interrupt factors 4202 to 4208 are set in the case where an interrupt has occurred in the print processing. In the present embodiment, the interrupt factors 4202 to 4208 are set in the case where an interrupt signal from the print image processing unit 503 is detected. The interrupt factor 4202 indicates that an underrun error has occurred. The underrun error is an error that occurs in the case where image data is not supplied in time for the print operation. The interrupt factor 4203 is not used in the present embodiment. The interrupt factor 4204 indicates that a main scan synchronization signal is received from the printer unit 140. The interrupt factor 4205 indicates that a sub scan synchronization signal is received from the printer unit 140. The interrupt factor 4206 indicates that the front end of paper has reached the printer unit 140. The interrupt factor 4207 indicates that the rear end of paper has reached the printer unit 140. The interrupt factor 4208 indicates that the print image processing unit 503 has completed processing of one page.

The interrupt control unit 507 delivers the generated interrupt packet to the packet input/output I/F 500. Then, the packet output unit 505 of the packet input/output I/F 500 transmits the interrupt packet to the system control unit 210 via the ring bus. The interrupt packet is received by the interrupt control unit 380 of the system control unit 210. The interrupt control unit 380 gives an interrupt notification to the CPU 310 based on the received interrupt packet. The CPU 310 controls the print processing unit 230 in accordance with the interrupt notification.

The packet output unit 505 arbitrates the packet data sent from the packet input unit 504, the setting hold unit 506, and the interrupt control unit 507 and transfers the packet data to the ring bus.

The decompressor 501 decompresses the compressed image data sent from the packet input/output I/F 500. Due to this, the compressed image data is restored into the pixel state where the image processing in the subsequent stages can be performed.

The packet/raster conversion unit 502 receives the decompressed image data from the decompressor 501 and converts the image data into raster image data. As described previously, in the packet, rectangular (32 pixels×32 pixels) image data is stored. In the case where the image forming apparatus 100 is an electrophotographic apparatus, the printing processing in the printer unit 140 is performed in the raster order (line order). Consequently, in the present embodiment, the packet/raster conversion unit 502 converts the arrangement of the pixels of the image data into the raster order. The packet/raster conversion unit 502 uses the RAM 208 as a temporary buffer at the time of converting the image data. The packet/raster conversion unit 502 accesses the RAM 208 via the RAM controller 260.

The print image processing unit 503 receives the image data converted into the raster order from the packet/raster conversion unit 502 and performs image processing as preprocessing to print the image data by the printer unit 140. Specifically, the image processing is color space conversion processing to convert RGB into CMYK, halftone processing by the dither method or the error diffusion method, gamma correction, and so on. The print image processing unit 503 outputs the image data after the image processing to the printer unit 140. At this time, it is necessary for the print image processing unit 503 to output the image data to the printer unit 140 in synchronization with the timing of activation of the printer unit 140 and the timing of sheet feed from the sheet feed unit 142. Because of this, the print image processing unit 503 buffers the image data after the image processing until that timing. Specifically, the print image processing unit 503 temporarily writes the image data after the image processing to the RAM 208 via the RAM controller 260. Then, the print image processing unit 503 reads the image data from the RAM 208 in synchronization with the timing of sheet feed and outputs the image data to the printer unit 140.

<Loopback Processing Unit>

FIG. 5B shows an example of an internal configuration of the loopback processing unit 240. A packet input/output I/F 510 has a packet input unit 514 and a packet output unit 515. Upon receipt of packet data, the packet input unit 514 refers to the chip ID 412 of the header part 410 and checks whether the ID is the same as the chip ID allocated to the loopback processing unit 240. In the case where the ID indicated by the chip ID 412 is different from the chip ID allocated to the loopback processing unit 240, the packet input unit 514 determines that the packet data is not packet data that should be processed by the loopback processing unit 240. Then, the packet input unit 514 transfers the packet data to the packet output unit 515. On the other hand, in the case where the ID indicated by the chip ID 412 is the same as the chip ID allocated to the loopback processing unit 240, the packet input unit 514 determines that the packet is a packet that should be processed by the loopback processing unit 240. At this time, in the case where image data is included in the packet, image processing is performed for the image data via a decompressor 511 and a loopback image processing unit 512. The image data after the image processing is input to the packet input/output I/F 510 via a compressor 513. Upon receipt of the image data from the compressor 513, the packet input/output I/F 510 adds a header to the image data and transmits the image data to the system control unit 210 as packet data. Further, in the case where a command is included in the packet, the packet input unit 514 refers to the setting address and the setting value stored in the data part 420 and sets the specified coefficient and mode to a setting hold unit 516. In the case where the packet includes a command to read the setting value, a packet storing the setting value is sent to the packet output unit 515 by the setting hold unit 516. The setting hold unit 516 holds the setting value that is used by the loopback processing unit 240. The decompressor 511, the loopback image processing unit 512, and the compressor 513 perform processing based on the setting values held by the setting hold unit 516.

In the case of detecting an interrupt signal from an external port 518 or the loopback image processing unit 512, an interrupt control unit 517 holds an interrupt factor corresponding to the detected interrupt signal as an interrupt status value. Then, the interrupt control unit 517 generates an interrupt packet. The contents of generation of the header part 410 are the same as the contents described previously. Consequently, only the generation of the data part 420 is explained here.

The interrupt control unit 517 stores the status value held at the time of detection of the interrupt signal in the data part 420. Interrupt factors 4211 to 4218 shown in FIG. 4 are examples of information that is stored in the data part of the interrupt packet sent out from the loopback processing unit 240. The interrupt factor 4211 is set in the case where an interrupt signal from the external port 518 is detected. The interrupt factors 4212 to 4218 are set in the case where an interrupt has occurred in the loopback processing. In the present embodiment, the interrupt factors 4212 to 4218 are set in the case where an interrupt signal from the loopback processing unit 240 is detected. The interrupt factor 4212 indicates that a format error has occurred. The format error is an error that occurs in the case where the format of the image data that is input to the loopback processing unit 240 does not coincide with the processing contents. The interrupt factors 4213 to 4217 are not used in the present embodiment. The interrupt factor 4218 indicates that the loopback processing unit 240 has completed processing of one page.

The interrupt control unit 517 delivers the generated interrupt packet to the packet input/output I/F 510. Then, the packet output unit 515 of the packet input/output I/F 510 transmits the interrupt packet to the system control unit 210 via the ring bus. The interrupt packet is received by the interrupt control unit 380 of the system control unit 210. The interrupt control unit 380 gives an interrupt notification to the CPU 310 based on the received interrupt packet. The CPU 310 controls the scan processing unit 250 in accordance with the interrupt notification.

The packet output unit 515 arbitrates the packet data sent from the packet input unit 514, the compressor 513, the setting hold unit 516, and the interrupt control unit 517 and transfers the packet data to the ring bus.

The decompressor 511 is the same as the decompressor 501, and therefore, explanation is omitted.

The compressor 513 compresses already-processed image data sent from the loopback image processing unit 512 and outputs the image data to the packet input/output I/F 510 in the subsequent stage. This compression processing is performed to make it possible to store the image data in the packet data.

The loopback image processing unit 512 performs editing-based image processing, for example, scaling processing, image combination processing, and rotation processing, having a possibility of being made use of both in the print processing and in the scan processing. The loopback image processing unit 512 performs the above-described editing-based image processing for the image data received from the decompressor 511 and outputs the image data after the processing to the compressor 513. Similarly, in the loopback image processing unit 512 of the loopback processing unit 241 of the extension controller unit 201, the above-described editing-based image processing is performed.

<Scan Processing Unit>

FIG. 5C shows an example of an internal configuration of the scan processing unit 250. A packet input/output I/F 520 has a packet input unit 524 and a packet output unit 525. Upon receipt of packet data, the packet input unit 524 refers to the chip ID 412 of the header part 410 and checks whether the ID is the same as the chip ID allocated to the scan processing unit 250. In the case where the ID indicated by the chip ID 412 is different from the chip ID allocated to the scan processing unit 250, the packet input unit 524 determines that the packet data is not packet data that should be processed by the scan processing unit 250. Then, the packet input unit 524 transfers the packet data to the packet output unit 525. On the other hand, in the case where the ID indicated by the chip ID 412 is the same as the chip ID allocated to the scan processing unit 250, the packet input unit 524 determines that the packet is a packet that should be processed by the scan processing unit 250. At this time, in the case where a command is included in the packet, the packet input unit 524 refers to the setting address and the setting value stored in the data part 420 and sets the specified coefficient and mode to a setting hold unit 526. To the scan processing unit 250, image data is input only from the scanner unit 110, and therefore, the received packet data does not indicate image data. In the case where the packet includes a command to read the setting value, a packet storing the setting value is sent to the packet output unit 525 by the setting hold unit 526. The setting hold unit 526 holds the setting value that is used by the scan processing unit 250. A compressor 521, a raster/packet conversion unit 522, and a scan image processing unit 523 perform processing based on the setting values held by the setting hold unit 526.

In the case of detecting an interrupt signal from an external port 528 or the scan image processing unit 523, an interrupt control unit 527 holds an interrupt factor corresponding to the detected interrupt signal as an interrupt status value. Then, the interrupt control unit 527 generates an interrupt packet. The contents of generation of the header part 410 are the same as the contents described previously. Consequently, only the generation of the header part 420 is explained here.

The interrupt control unit 527 stores the status value held at the time of detection of the interrupt signal in the data part 420. Interrupt factors 4221 to 4228 shown in FIG. 4 are examples of information that is stored in the data part of the interrupt packet sent from the scan processing unit 250. The interrupt factor 4221 is set in the case where an interrupt signal from the external port 528 is detected. The interrupt factors 4222 to 4228 are set in the case where an interrupt has occurred in the scan processing. In the present embodiment, the interrupt factors 4222 to 4228 are set in the case where an interrupt signal from the scan processing unit 250 is detected. The interrupt factor 4222 indicates that an overrun error has occurred. The overrun error is an error that occurs in the case where write of the scan data to the memory is not completed in time for the scan operation. The interrupt factor 4223 is not used in the present embodiment. The interrupt factor 4224 indicates that a main scan synchronization signal is received from the scanner unit 110. The interrupt factor 4225 indicates that a sub scan synchronization signal is received from the scanner unit 110. The interrupt factor 4226 indicates that the front end of paper has reached the scanner unit 110. The interrupt factor 4227 indicates that the rear end of paper has reached the scanner unit 110. The interrupt factor 4228 indicates that the scan image processing unit 523 has completed processing of one page.

The interrupt control unit 527 delivers the generated interrupt packet to the packet input/output I/F 520. Then, the packet output unit 525 of the packet input/output I/F 520 transmits the interrupt packet to the system control unit 210 via the ring bus. The interrupt packet is received by the interrupt control unit 380 of the system control unit 210. The interrupt control unit 380 gives an interrupt notification to the CPU 310 based on the received interrupt packet. The CPU 310 controls the scan processing unit 250 in accordance with the interrupt notification.

The packet output unit 525 arbitrates the packet data sent from the packet input unit 524, the setting hold unit 526, and the interrupt control unit 527 and transfers the packet data to the ring bus.

The compressor 521 compresses the image data sent from the raster/packet conversion unit 522 and outputs the image data to the packet input/output I/F 520 in the subsequent stage. This compression processing is performed to make it possible to store the image data in the packet data.

The raster/packet conversion unit 522 converts the image data received from the scan image processing unit 523 into image data that can be transmitted in a packet. As described previously, in the present embodiment, the image data that is stored in the data part of packet data is rectangular (32 pixels×32 pixels) image data. On the other hand, the scan processing in the scanner unit 110 is performed in the raster order (line order) by using a line-type image sensor. Consequently, the raster/packet conversion unit 522 rearranges the pixels of the image data received from the scan image processing unit 523 for each rectangle of 32 pixels×32 pixels. The raster/packet conversion unit 522 uses the RAM 208 as a temporary buffer at the time of converting the image data.

The scan image processing unit 523 receives image data from the scanner unit 110 and performs image processing, such as shading correction processing, MTF correction processing, input gamma correction, and filter processing. The image data after the image processing is output to the raster/packet conversion unit 522. It is necessary for the scan image processing unit 523 to receive image data in time for the transfer speed of the image data that is input in order to prevent the scan operation using the image sensor of the scanner unit 110 from being suspended. On the other hand, in the case where the packet transmission by the packet input/output I/F 520 and the packet transmission of another processing unit (the print processing unit 230 or the loopback processing unit 240) take place at the same timing, there is a case where the packet transmission of the scan image processing unit 523 itself is delayed. In such a case, the transmission speed of a packet is no longer stable. Because of this, the scan image processing unit 523 uses the RAM 208 as an image buffer for temporary buffering until the transmission timing. Then, the scan image processing unit 523 reads the image data temporarily stored in the RAM 208 in synchronization with the timing of packet transmission and transmits the read image data to the raster/packet conversion unit 522.

<Ring Bus Switch>

Figure 6:
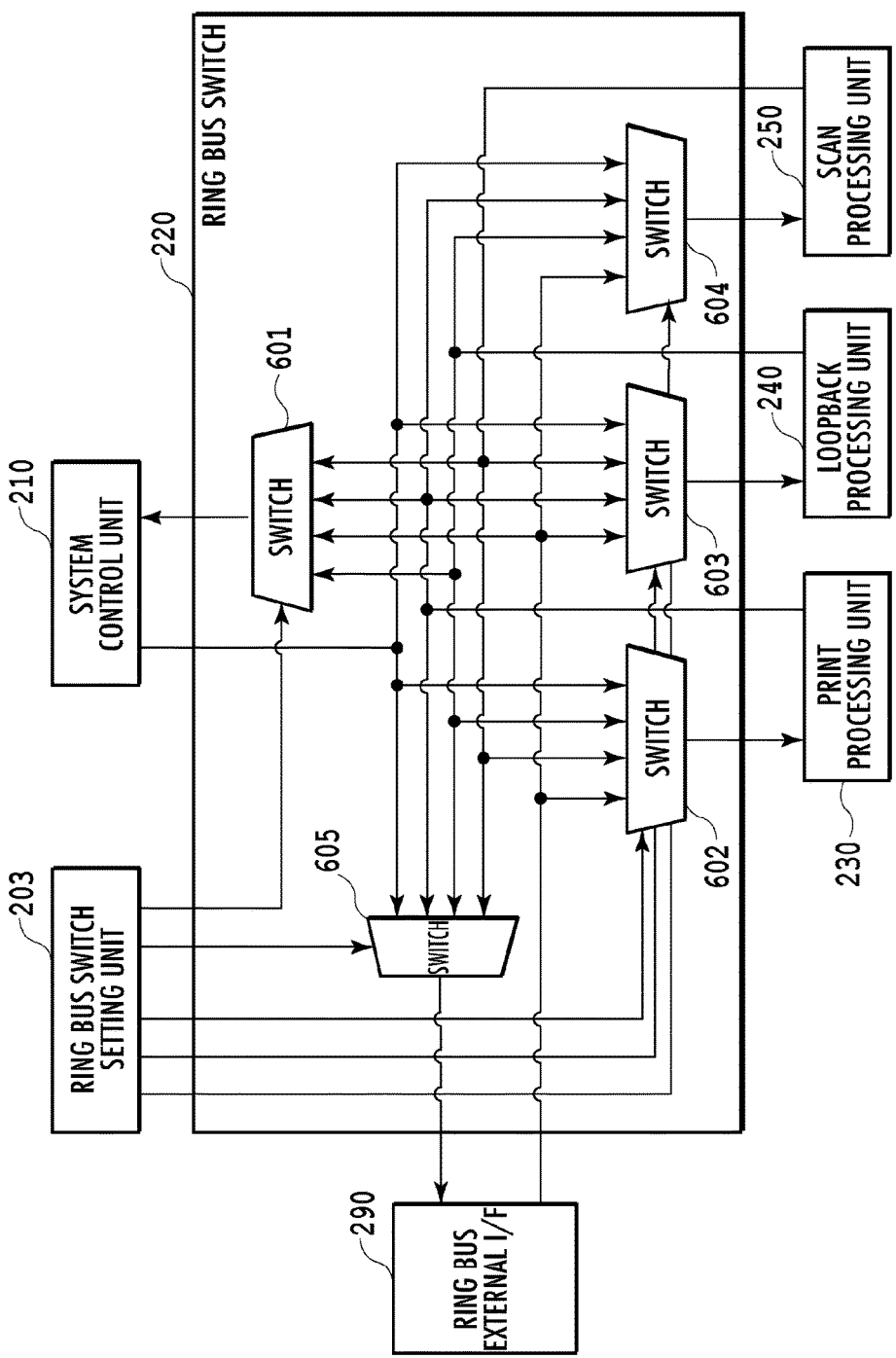
FIG. 6 is a block diagram showing an example of an internal configuration of a ring bus switch in the first embodiment.

FIG. 6 is a block diagram showing an example of an internal configuration of the ring bus switch 220 in the first embodiment. The ring bus switch 220 has a switch 601 to a switch 605. The switch 601 to the switch 605 are each a switch capable of selecting one from a plurality of inputs and outputting the input, and for example, are each a multiplexer. Each of the switch 601 to the switch 605 switches connection destinations in the ring bus in accordance with a value (setting value) set to the ring bus switch setting unit 203.

Due to this, it is possible to freely change the connection order of the system control unit 210, the print processing unit 230, the loopback processing unit 240, the scan processing unit 250, and the ring bus external I/F 290 on the ring bus.

In the present embodiment, as described above, the above-described setting value is set by the mode setting unit 202 before causing the ring bus to operate. However, the configuration is only required to be one in which the value of the ring bus switch can be settled before causing the ring bus to operate and it may also be possible to design the configuration so that the setting can be changed from the outside of the main controller unit 200 and the extension controller unit 201. For example, it may also be possible to design the configuration so that a user can change the above-described setting value via the operation unit 130 by using software capable of editing the above-described setting value. At this time, the above-described software is executed by the CPU 310 of the system control unit 210. Alternatively, it may also be possible to design the configuration so that the above-described mode setting information can be set from the outside of the controller unit 120. For example, it may also be possible to design the configuration so that the value of the mode setting information can be changed from a host computer, not shown schematically, via the network 150.

<Operation of Controller Unit>

Figure 7:
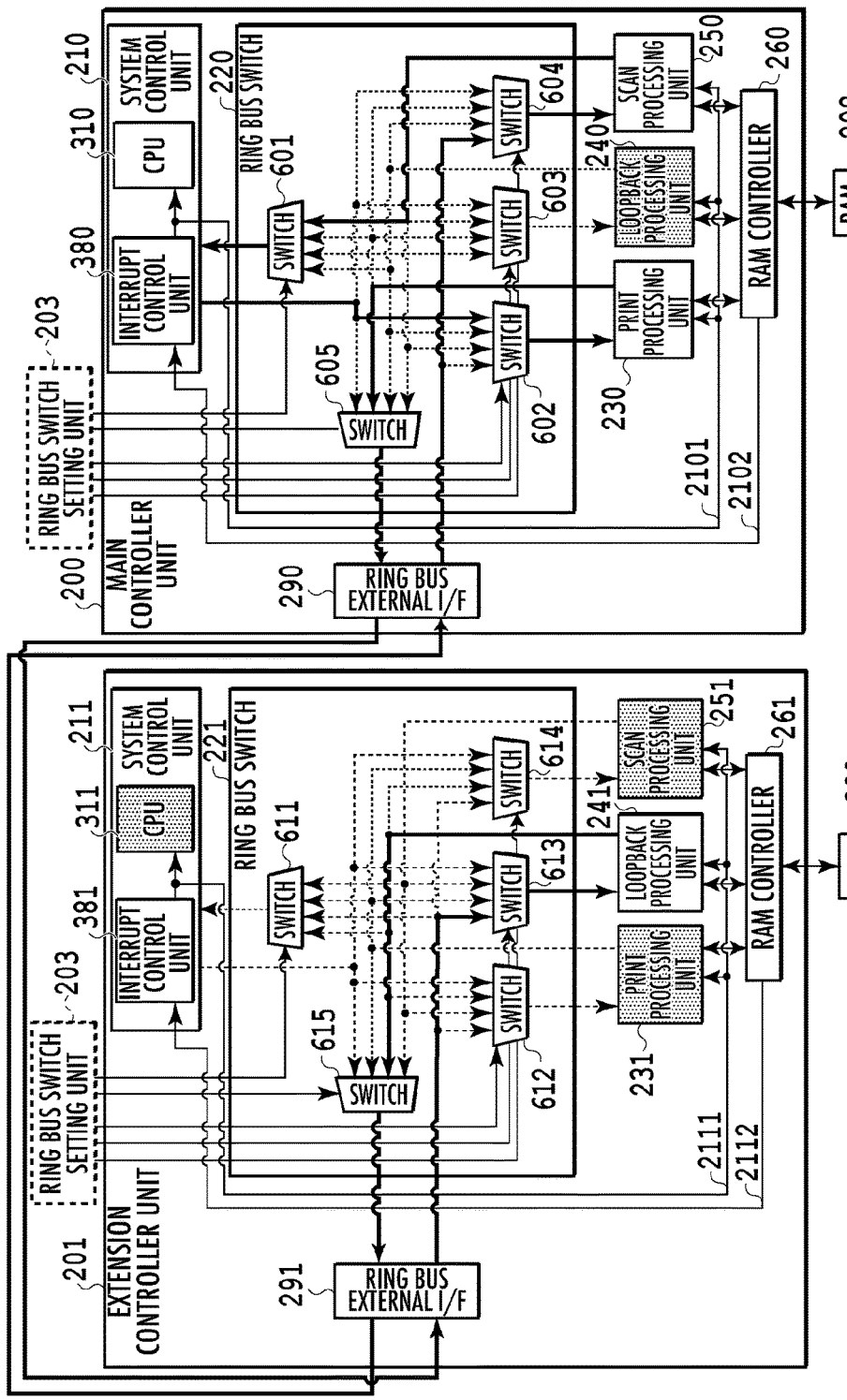
FIG. 7 is a diagram for explaining operations of the controller unit in the first embodiment.

FIG. 7 is a diagram for explaining the operation of the controller unit 120 in the first embodiment. FIG. 7 shows the way the interrupt of a RAM controller 261 is transmitted from the extension controller unit 201 to the main controller unit 200 via the ring bus external I/Fs 291 and 290.

As described above, each switch of the ring bus switch 220 of the main controller unit 200 is controlled in accordance with the setting value of the ring bus switch setting unit 203. Due to this, the packet whose start point is the system control unit 210 circulates through the print processing unit 230, the ring bus external I/F 290, and the scan processing unit 250 and returned to the system control unit 210. Such connection control is performed in the case where the extension controller unit 201 is used along with the main controller unit 200 as shown in FIG. 7.

Each switch of the ring bus switch 221 of the extension controller unit 201 is controlled in accordance with the setting value of the ring bus switch setting unit 213. Due to this, the packet that is input from the outside via the ring bus external I/F 291 is delivered to the loopback processing unit 241 and returns to the outside again via the ring bus external I/F 291.

By combining the main controller unit 200 and the extension controller unit 201, both having the ring bus switch as described above, the path (path indicated by the thick-line arrow) as shown in FIG. 7 is constructed. Due to this, the packet whose start point is the system control unit 210 circulates through the print processing unit 230, the loopback processing unit 241, and the scan processing unit 250 and returns to the system control unit 210 again. As described above, by using the loopback processing unit 241 of the extension controller unit 201 without using the loopback processing unit 240 of the main controller unit 200, it is possible to relax the congestion of the data transfer path to the RAM 208. Further, due to this, it is possible to prevent a reduction in the performance of the main controller unit 200.

In the system shown in FIG. 7, the supply of power source to the loopback processing unit 240, the print processing unit 231, and the scan processing unit 251, which do not need to be caused to operate, is shut off. Due to this, it is possible to reduce the power consumption of the system. These components are displayed in gray-out in FIG. 7.

Further, in the system shown in FIG. 7, the CPU 310 of the main controller unit 200 controls the extension controller unit 201. Because of this, it is also possible to shut off the supply of power source to the CPU 311 of the system control unit 211. Consequently, it is possible to further reduce the power consumption of the system. The ROM to activate the CPU 311 of the extension controller unit 201 and the software to arbitrate the control timing between the CPU 310 and the CPU 311 are no longer necessary. Consequently, it is possible to simplify the configuration of the system.

In the system shown in FIG. 7, the supply of power source to the CPU 311 of the system control unit 211 is shut off, and therefore, it is necessary to notify the CPU 310, not the CPU 311, of the interrupt signal output from an interrupt control unit 381 of the system control unit 211. For example, in the present embodiment, the RAM controller 261 performs initialization, such as adjustment timing of access to the RAM 209, at the time of activation. In the case where the RAM 209 is the DDR 3 SDRAM, it is necessary to perform processing, such as ZQ calibration and DLL reset, at the time of activation. Here, in the present embodiment, for simplification of the software control, it is assumed that the RAM controller 261 performs the processing by itself and causes an interrupt (initialization completion interrupt) to occur on completion of the processing. The initialization completion interrupt is notified to the interrupt control unit 381 of the system control unit 211 as an interrupt signal 2112. In the case of detecting the interrupt signal 2112, the interrupt control unit 381 inputs the interrupt signal 2111 to the interrupt external port of the loopback processing unit 241. Then, the loopback processing unit 241 generates an interrupt packet as described previously. The generated interrupt packet is transferred to the system control unit 210 of the main controller unit 200 via the ring bus external I/Fs 291 and 290 as shown in FIG. 7 and received by the scan processing unit 250. Here, to the chip ID of the interrupt packet, the chip ID corresponding to the system control unit 210 is set. Consequently, the scan processing unit 250 transfers the interrupt packet as it is. The transferred interrupt packet is received by the interrupt control unit 380 of the system control unit 210 via the ring bus switch 220 and an interrupt notification is given to the CPU 310 by the interrupt control unit 380.

Here, as the interrupt signal that is input to the system control unit 211, the interrupt signal 2112 corresponding to the initialization completion interrupt of the RAM 209 is taken as an example. However, in the case where another interrupt signal is input to the system control unit 211, the interrupt signal is also processed similarly.

Further, in the case where an interrupt (for example, an interrupt of overrun error) has occurred in the loopback processing unit 241, as described above, in the interrupt control unit of the loopback processing unit 241, an interrupt packet in which "3" is set to the chip ID is generated. Then, the generated packet is transferred to the system control unit 210 of the main controller unit 200 via the path as shown in FIG. 7 and an interrupt notification is given to the CPU 310 by the interrupt control unit 380 in the system control unit 210. Consequently, it is possible for the CPU 310 of the system control unit 210 to detect the interrupt that has occurred in the loopback processing unit 241.

On the other hand, the interrupt signal 2101 that is transmitted from the interrupt control unit 380 of the main controller unit 200 is similarly notified to the print processing unit 230 and the scan processing unit 250. However, in the present embodiment, it is assumed that the print processing unit 230 and the scan processing unit 250 perform mask control for the interrupt signal 2101 so that no interrupt packet is generated.

As above, in the present embodiment, in the controller unit 120, in the case where the CPU 311 of the extension controller unit 201 is suspended, an interrupt notification is given to the CPU 310 of the main controller unit 200 by the extension controller unit 201. Consequently, according to the present embodiment, in the system constructed by a plurality of integrated circuits, even in the case where an interrupt has occurred in the integrated circuit in which the function of the CPU is suspended, it is made possible to appropriately perform interrupt control.

In the present embodiment, the configuration is taken as an example, in which the loopback processing unit 240 of the main controller unit 200, the CPU 311 of the system control unit 211, the print processing unit 231, and the scan processing unit 251 are suspended, but the configuration is not limited to this. The configuration may be any configuration as long as being capable of generating an interrupt packet in the processing unit that is caused to operate in the extension controller unit 201 and giving an interrupt notification to the CPU 310 of the main controller unit 200. In the case where there is a plurality of processing units to be caused to operate in the extension controller unit 201, it may also be possible to select one of the processing units and to cause the interrupt control unit of the selected processing unit to generate an interrupt packet in accordance with the interrupt signal 2111. On the other hand, for the interrupt control unit of the processing unit that is not selected, it is sufficient to perform setting so that no interrupt packet is generated.

In the present embodiment, the configuration is taken as an example, in which the ring bus switch setting unit 203 is arranged outside the main controller unit 200 and the extension controller unit 201. However, it may also be possible for each of the main controller unit 200 and the extension controller unit 201 to have the ring bus switch setting unit. In such a case, it is sufficient for the mode setting unit 200 to perform setting for the ring bus switch setting unit of the main controller unit 200 and for the ring bus switch setting unit of the extension controller unit 201, respectively, based on the mode setting information.

In the present embodiment, for the interrupt signal 2101 that is transmitted from the interrupt control unit 380 of the main controller unit 200, the mask control is performed in the print processing unit 230 and the scan processing unit 250. However, it may also be possible for the interrupt control unit to determine the operating mode of the LSI and to switch the transmission destination of the interrupt notification to the CPU or each processing module based on the determination results. In order to implement such an aspect, for example, it is sufficient to cause each LSI to hold the operating mode information indicating whether each LSI is operating as the main controller unit or operating as the extension controller unit. Then, it is sufficient for the mode setting unit 202 to set the operating mode information on each LSI based on the mode setting information and for the interrupt control unit of each LSI to perform the above-described determination based on the operating mode information.

Second Embodiment

Figure 8:
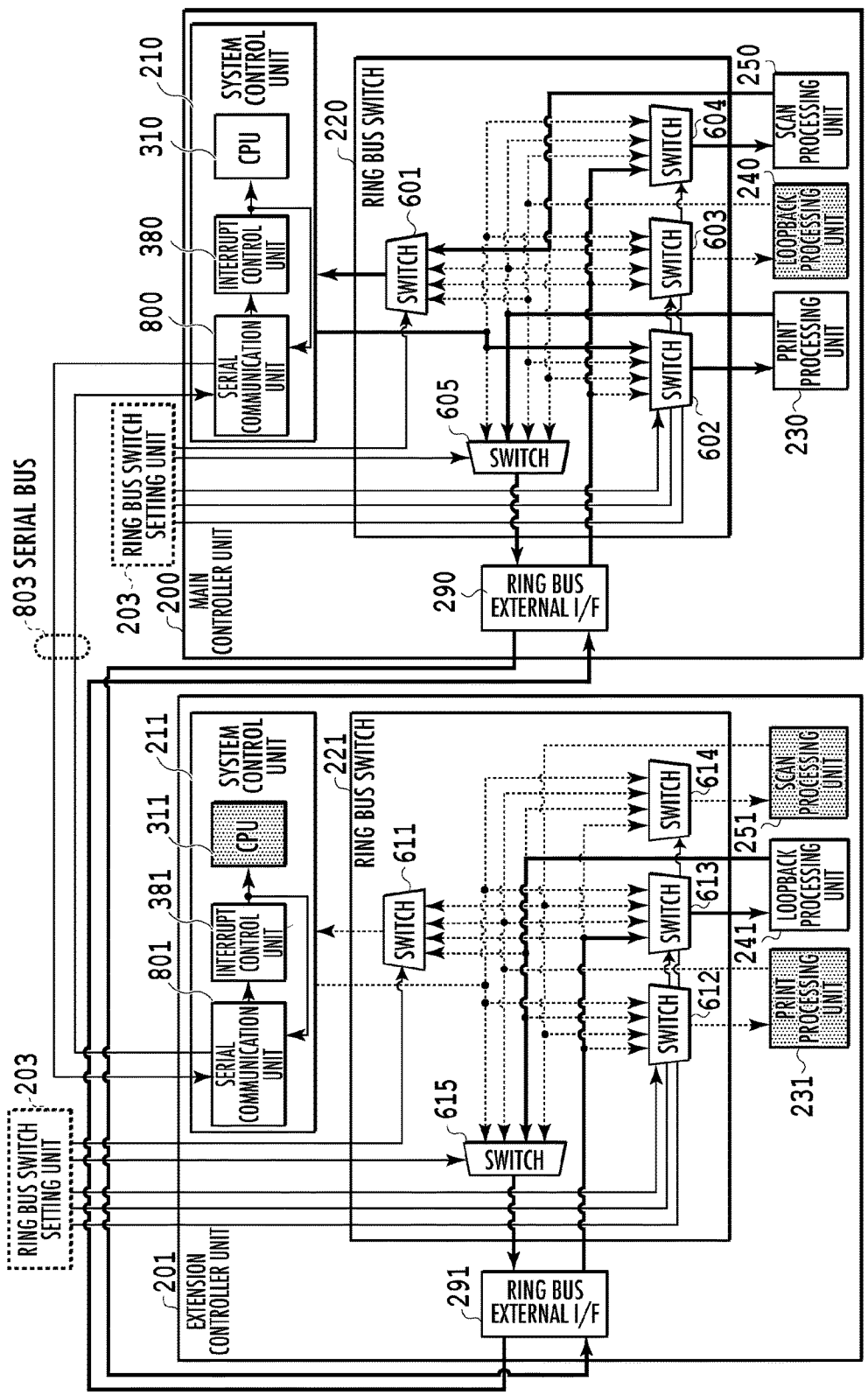
FIG. 8 is a diagram for explaining operations of a controller unit in a second embodiment.

FIG. 8 is a diagram for explaining the operation of the main controller unit 120 in a second embodiment. As shown in FIG. 8, the system control unit 210 of the main controller unit 200 in the second embodiment has a serial communication unit 800. The system control unit 211 of the extension controller unit 201 has a serial communication unit 801. Further, the serial communication units 800 and 801 are connected to each other via a serial bus 803 as shown in FIG. 8. FIG. 8 shows the way interrupt transmission (data transmission to make a request for interrupt processing) is performed from the extension controller unit 201 to the main controller unit 200 via the serial communication units 800 and 801 connected by the serial bus 803. In the following, only differences from the system shown in FIG. 7 are explained.

The serial communication unit 800 performs transmission and reception of data via the serial bus 803. It is assumed that the UART (Universal Asynchronous Receiver Transmitter) communication or the like is used as the serial communication protocol.

The components displayed in gray-out in FIG. 8 are components that do not need to be caused to operate as in FIG. 7. Consequently, as in the system shown in FIG. 7, the interrupt of the interrupt control unit 381 of the extension controller unit 201 needs to be notified to the CPU 310, not the CPU 311. Consequently, in the present embodiment, as shown in FIG. 8, the configuration is employed in which the interrupt signal that is output from the interrupt control unit 381 is input to the serial communication unit 801.

<Controller Unit>

Figure 9:
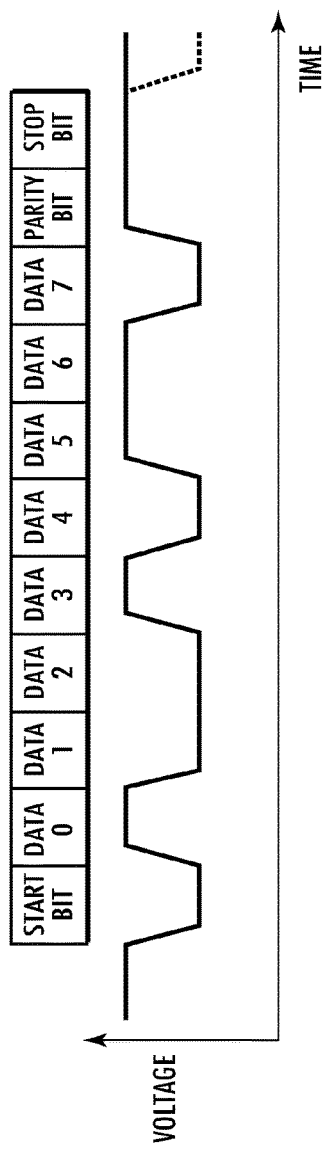
FIG. 9 is a diagram for explaining serial communication that is performed between a main controller unit and an extension controller unit.

In the case of detecting an interrupt, the serial communication unit 801 starts serial communication via the serial bus 803. FIG. 9 is a diagram for explaining the serial communication that is performed between the main controller unit 200 and the extension controller unit 201. In FIG. 9, a communication format of the serial communication (UART communication) in the present embodiment is shown. It is assumed that the set baud rate of the serial communication in the present embodiment is 9600 bps and the number of data bits is eight. Further, it is also assumed that the parity is set to even and the number of stop bits is one. The High signal (signal whose signal level is High) in the serial bus 803 normally indicates an idle state. In the case where the serial communication unit 801 of the extension controller unit 201 performs interrupt transmission, the serial communication unit 800 first outputs a signal at the Low level indicating the start bit. At this time, the serial communication unit 801 performs control so that the output signal is held at the Low level for the specified time (here, the time corresponding to one bit). Next, the serial communication unit 801 controls the signal level indicating 8-bit data. Here, it is assumed that data "10010110" is transmitted. Next, the serial communication unit 801 controls the parity bit so that the signal becomes a signal indicating even parity. Here, the number of is in the 8-bit data "10010110" is four, and therefore, the signal indicating the parity bit is controlled so as to become the High level. Finally, the serial communication unit 801 performs control so that the signal indicating the stop bit becomes the High level. In the case where communication is not performed continuously, the serial communication unit 801 controls the signal so that the High level is maintained and in the case where communication is performed continuously, the serial communication unit 801 controls the signal so as to become the Low level indicating the start bit.

Here, it is assumed that the serial communication unit 800 is designed so as to give a notification to the interrupt control unit 380 in the case where the serial communication unit 800 of the main controller unit 200, which is the reception side, receives the data "10010110". Upon receipt of the notification from the serial communication unit 800, the interrupt control unit 380 detects an interrupt from the extension controller unit 201 and notifies the CPU 310 of the interrupt. Here, upon receipt of the interrupt, the serial communication unit 800 transmits data indicating that reception has been performed correctly, for example, "10010110" that is the same as the received data. Upon receipt of the data from the serial communication unit 800, the serial communication unit 801 terminates the interrupt processing by regarding the interrupt transmission as having been performed correctly. Here, in the case where the received even parity is not correct, the serial communication unit 800 transmits a signal indicating a parity error to the serial communication unit 801. It is assumed that the serial communication unit 801 performs the interrupt transmission again in the case of receiving a signal indicating a parity error.

It is needless to say that the protocol of serial communication is not limited to the UART and the protocol may be a method, for example, such as an I2C (Inter Integrated Circuit) and an SPI (Serial Peripheral Interface).

Further, it is needless to say that the value that is stored in the data to be transmitted in the interrupt transmission may be changed in accordance with the interrupt factor.

As above, in the system including the main controller unit 200 and the extension controller unit 201, it is made possible to notify the CPU 310 of the main controller unit 200 of the interrupt from the extension controller unit 201 via the serial bus 803.

Further, in the present embodiment, the interrupt transmission is performed by using the UART communication and the like, and therefore, it is possible to use the already-existing serial communication interface (SCI: Serial Communication Interface) as the serial communication units 800 and 801. For example, in the case where the system control unit is implemented by a microcomputer, on a condition that the microcomputer includes the SCI, it is possible to use the SCI as the serial communication units 800 and 801.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, in a system constructed by a plurality of integrated circuits, it is possible to appropriately perform interrupt control even in the case where an interrupt has occurred in the integrated circuit in which the function of the CPU is suspended.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-240441, filed Dec. 12, 2016, which is hereby incorporated by reference wherein in its entirety.

What is claimed is:

1. An information processing apparatus comprising:
a first semiconductor integrated circuit having a plurality of image processing units, a control unit configured to control the plurality of image processing units, and an interrupt unit configured to output an interrupt to the control unit; and
a second semiconductor integrated circuit connected with the first semiconductor integrated circuit so as to be capable of communication and having a plurality of image processing units, a control unit configured to control the plurality of image processing units, and an interrupt unit configured to output an interrupt to the control unit, wherein
the interrupt unit of the second semiconductor integrated circuit outputs an interrupt to at least one of the plurality of image processing units of the second semiconductor integrated circuit,
the image processing unit of the second semiconductor integrated circuit, to which the interrupt from the interrupt unit of the second semiconductor integrated circuit is input, outputs an interrupt to at least one of the plurality of image processing units of the first semiconductor integrated circuit in accordance with the interrupt being input from the interrupt unit of the second semiconductor integrated circuit,
the image processing unit of the first semiconductor integrated circuit, to which an interrupt from the second semiconductor integrated circuit is input, outputs an interrupt to the interrupt unit of the first semiconductor integrated circuit in accordance with the interrupt being input from the second semiconductor integrated circuit, and
the interrupt unit of the first semiconductor integrated circuit outputs an interrupt to the control unit of the first semiconductor integrated circuit in accordance with the interrupt being input from the image processing unit of the first semiconductor integrated circuit.

2. The information processing apparatus according to claim 1, wherein
the image processing unit of the second semiconductor integrated circuit, to which the interrupt is input, generates an interrupt packet and transmits the interrupt packet to the first semiconductor integrated circuit.

3. The information processing apparatus according to claim 2, wherein
the image processing unit of the second semiconductor integrated circuit, to which the interrupt is input, has a port to which the interrupt is input and generates the interrupt packet in accordance with the interrupt being input to the port.

4. The information processing apparatus according to claim 1, wherein
the plurality of image processing units of the first semiconductor integrated circuit has at least a first type image processing unit and a second type image processing unit,
the plurality of image processing units of the second semiconductor integrated circuit has at least a first type image processing unit and a second type image processing unit, and
the first type image processing unit of the first semiconductor integrated circuit, the second type image processing unit of the second semiconductor integrated circuit, and the control unit of the first semiconductor integrated circuit are connected so as to be capable of data communication.

5. The information processing apparatus according to claim 4, wherein
the plurality of image processing units of the first semiconductor integrated circuit further has a third type image processing unit, and
the first type image processing unit of the first semiconductor integrated circuit, the second type image processing unit of the second semiconductor integrated circuit, the third type image processing unit of the first semiconductor integrated circuit, and the control unit of the first semiconductor integrated circuit are connected so as to be capable of data communication.

6. The information processing apparatus according to claim 5, wherein
the first type image processing unit of the first semiconductor integrated circuit, the second type image processing unit of the second semiconductor integrated circuit, the third type image processing unit of the first semiconductor integrated circuit, and the control unit of the first semiconductor integrated circuit are connected so that data is transmitted between those units in that order.

7. The information processing apparatus according to claim 5, further comprising:
a printer unit; and
a scanner unit, wherein
the first type image processing unit transmits processed data to the printer unit, and
the third type image processing unit performs processing for data received from the scanner unit.

8. The information processing apparatus according to claim 1, wherein
the second semiconductor integrated circuit further has an external interface that outputs the interrupt output from the image processing unit of the second semiconductor integrated circuit to the first semiconductor integrated circuit.

9. The information processing apparatus according to claim 8, wherein
the first semiconductor integrated circuit further has an external interface that receives the interrupt output from the external interface of the second semiconductor integrated circuit and outputs an interrupt to at least one of the plurality of image processing units of the first semiconductor integrated circuit in accordance with reception of the interrupt from the external interface of the second semiconductor integrated circuit.

10. An information processing apparatus comprising:
a first semiconductor integrated circuit having a plurality of image processing units, a control unit configured to control the plurality of image processing units, and an interrupt unit configured to output an interrupt to the control unit; and
a second semiconductor integrated circuit having a plurality of image processing units, a control unit configured to control the plurality of image processing units, and an interrupt unit configured to output an interrupt to the control unit, wherein
the second semiconductor integrated circuit has a transmission unit configured to transmit an interrupt output from the interrupt unit of the second semiconductor integrated circuit to the first semiconductor integrated circuit,
the first semiconductor integrated circuit has a reception unit configured to receive the interrupt transmitted from the transmission unit, and
the interrupt received by the reception unit of the first semiconductor integrated circuit is input to the control unit of the first semiconductor integrated circuit.

11. The information processing apparatus according to claim 10, wherein
the transmission unit and the reception unit are connected by a serial bus.

12. The information processing apparatus according to claim 10, wherein
the interrupt output from the interrupt unit of the second semiconductor integrated circuit is input to one of the plurality of image processing units of the second semiconductor integrated circuit, and
the image processing unit of the second semiconductor integrated circuit, to which the interrupt is input, generates an interrupt packet and transmits the interrupt packet to the first semiconductor integrated circuit.

13. The information processing apparatus according to claim 10, wherein
the plurality of image processing units of the first semiconductor integrated circuit has at least a first type image processing unit and a second type image processing unit,
the plurality of image processing units of the second semiconductor integrated circuit has at least a first type image processing unit and a second type image processing unit, and
the first type image processing unit of the first semiconductor integrated circuit, the second type image processing unit of the second semiconductor integrated circuit, and the control unit of the first semiconductor integrated circuit are connected so as to be capable of data communication.

14. A semiconductor integrated circuit having a plurality of image processing units, a control unit configured to control the plurality of image processing units, and an interrupt unit configured to output an interrupt to the control unit, the circuit having:
an external interface that receives an interrupt output from an external device; and
a switch unit configured to output an interrupt received by the external interface to one of the plurality of image processing units, wherein
one of the plurality of image processing units, to which the interrupt is input, outputs an interrupt to the interrupt unit in accordance with the interrupt being input from the switch unit.

15. The semiconductor integrated circuit according to claim 14, wherein
the interrupt unit outputs an interrupt to the control unit in accordance with the interrupt being input from one of the plurality of image processing units.

16. The semiconductor integrated circuit according to claim 14, having:
a bus that connects the image processing unit, the interrupt unit, and the external interface, wherein
the switch unit controls a path of the bus so that an interrupt received by the external interface is transferred to one of the plurality of image processing units.

17. The semiconductor integrated circuit according to claim 16, wherein
the interrupt unit outputs an interrupt to at least one of the plurality of image processing units, and
the image processing unit, to which the interrupt is input from the interrupt unit, outputs an interrupt to the external device via the external interface in accordance with the interrupt being input from the interrupt unit.

18. The semiconductor integrated circuit according to claim 17, wherein
the image processing unit, to which the interrupt is input from the interrupt unit, generates an interrupt packet and transmits the interrupt packet to the external device via the external interface.

19. The semiconductor integrated circuit according to claim 18, wherein
the image processing unit, to which the interrupt is input from the interrupt unit, has a port to which the interrupt from the interrupt unit is input and generates the interrupt packet in accordance with the interrupt being input to the port.

20. The semiconductor integrated circuit according to claim 19, wherein
the switch unit controls a path of the bus so that the interrupt packet output from the image processing unit is transferred to the external interface.

\* \* \* \* \*